(12) United States Patent
Shahbandar

(10) Patent No.: US 12,496,942 B2
(45) Date of Patent: Dec. 16, 2025

(54) BABY CARRIER

(71) Applicant: Bean Ventures LLC, Hinsdale, IL (US)

(72) Inventor: Lena Shahbandar, Burr Ridge, IL (US)

(73) Assignee: Bean Ventures LLC, Hinsdale, IL (US)

( * ) Notice: Subject to any disclaimer, the term of this patent is extended or adjusted under 35 U.S.C. 154(b) by 0 days.

(21) Appl. No.: 18/747,362

(22) Filed: Jun. 18, 2024

(65) Prior Publication Data

US 2024/0336173 A1 Oct. 10, 2024

Related U.S. Application Data

(60) Continuation of application No. 17/931,544, filed on Sep. 12, 2022, now Pat. No. 12,012,021, which is a division of application No. 17/652,093, filed on Feb. 22, 2022, now Pat. No. 11,440,444, which is a continuation-in-part of application No. 17/450,688, filed on Oct. 12, 2021, now abandoned, which is a continuation of application No. 17/334,654, filed on May 28, 2021, now abandoned, which is a continuation-in-part of application No. 17/149,711, filed on Jan. 14, 2021, now abandoned, which is a continuation of application No. 16/286,584, filed on Feb. 26, 2019, now abandoned, which is a continuation-in-part of application No. PCT/US2017/048784, filed on Aug. 26, 2017.

(Continued)

(51) Int. Cl.
*B60N 2/28* (2006.01)
*A47D 13/02* (2006.01)

(52) U.S. Cl.
CPC ........ *B60N 2/2842* (2013.01); *A47D 13/025* (2013.01); *B60N 2/2812* (2013.01); *B60N 2/2816* (2023.08); *B60N 2/2845* (2013.01); *B60N 2/2881* (2013.01)

(58) Field of Classification Search
CPC .................................................... A47D 13/025
See application file for complete search history.

(56) References Cited

U.S. PATENT DOCUMENTS

2007/0029356 A1* 2/2007 Moriguchi ........... A47D 13/025
224/160
2018/0296005 A1* 10/2018 Tsai ..................... A47D 13/029
(Continued)

FOREIGN PATENT DOCUMENTS

CN 203168606 U * 9/2013 ........... A47D 13/025
CN 203885123 U * 10/2014 ........... A47D 13/025
(Continued)

*Primary Examiner* — Timothy J Brindley
(74) *Attorney, Agent, or Firm* — Umair A. Qadeer

(57) ABSTRACT

A baby carrier system is disclosed herein. The baby carrier system includes a baby carrier and a waist strap. The baby carrier includes a main body, a baby securing system, and shoulder straps. The waist strap may preferably be detachable and adjustable. In some embodiments, the baby carrier system may be a multi-functional baby carrier system that includes a multi-functional baby carrier configured for use as a car seat insert, where the multi-functional baby carrier includes fastener slits that allow for a car seat harness to secure a baby when the fastener slits are unfastened.

20 Claims, 21 Drawing Sheets

Related U.S. Application Data

(60) Provisional application No. 62/379,936, filed on Aug. 26, 2016.

(56) References Cited

U.S. PATENT DOCUMENTS

| | | | | |
|---|---|---|---|---|
| 2020/0253392 | A1* | 8/2020 | Sahadi | A47D 13/025 |
| 2021/0369002 | A1* | 12/2021 | Fulcher, Jr. | A47D 1/10 |
| 2022/0047095 | A1* | 2/2022 | Gilboa | A47D 13/025 |

FOREIGN PATENT DOCUMENTS

| | | | | | |
|---|---|---|---|---|---|
| CN | 204617687 U | * | 9/2015 | | A47D 13/025 |
| CN | 211608925 U | * | 10/2020 | | |
| CN | 111904214 A | * | 11/2020 | | A47D 13/025 |
| CN | 113812806 A | * | 12/2021 | | A47D 13/025 |
| DE | 202007016924 U1 | * | 5/2009 | | A47D 13/025 |
| DE | 202016103901 U1 | * | 10/2016 | | |
| EP | 3760082 A1 | * | 1/2021 | | A47D 13/025 |
| JP | 6584579 B1 | * | 10/2019 | | |
| KR | 20130003372 U | * | 6/2013 | | |
| KR | 200476693 Y1 | * | 3/2015 | | |
| KR | 20150053581 A | * | 5/2015 | | |
| KR | 20150088030 A | * | 7/2015 | | |
| KR | 200481152 Y1 | * | 8/2016 | | |
| KR | 20170003426 U | * | 10/2017 | | |
| KR | 101999940 B1 | * | 7/2019 | | |
| KR | 20200001271 A | * | 1/2020 | | |
| KR | 20200053179 A | * | 5/2020 | | |
| KR | 20210105712 A | * | 8/2021 | | |
| KR | 20210111414 A | * | 9/2021 | | |
| KR | 102341649 B1 | * | 12/2021 | | |
| KR | 20220000089 U | * | 1/2022 | | |
| WO | WO-2013079296 A1 | * | 6/2013 | | A47D 13/025 |
| WO | WO-2017117493 A1 | * | 7/2017 | | A47D 13/025 |
| WO | WO-2018169147 A1 | * | 9/2018 | | A44B 11/25 |
| WO | WO-2020226313 A1 | * | 11/2020 | | A41B 13/06 |
| WO | WO-2021075654 A1 | * | 4/2021 | | A41B 13/06 |
| WO | WO-2021215613 A1 | * | 10/2021 | | |

* cited by examiner

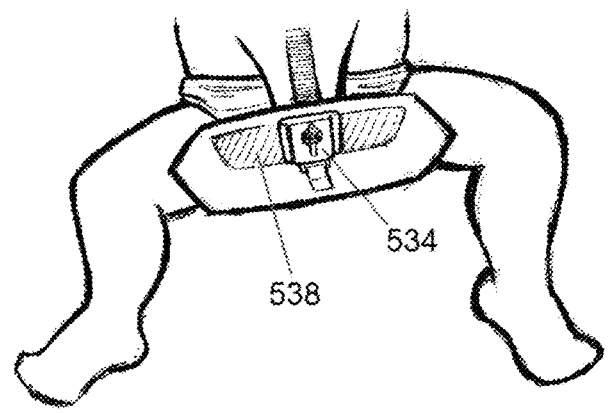
FIG. 20A  FIG. 20B
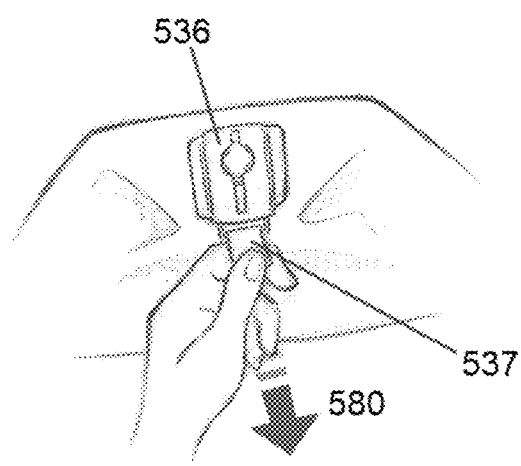
FIG. 21

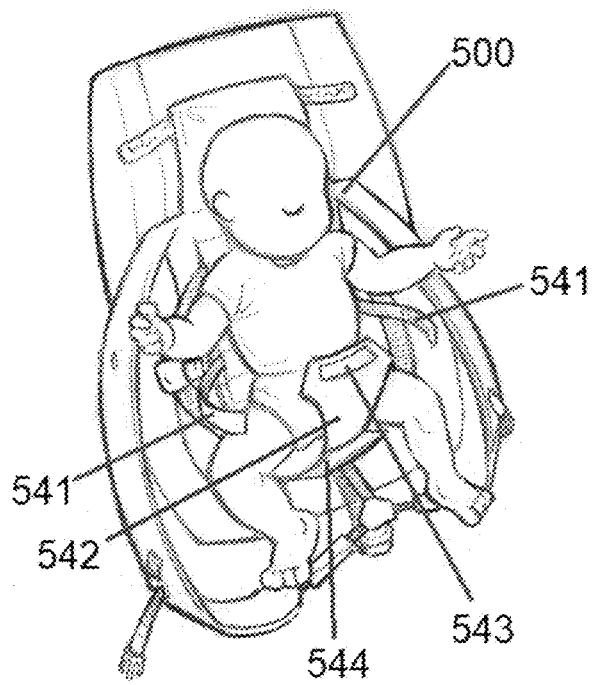 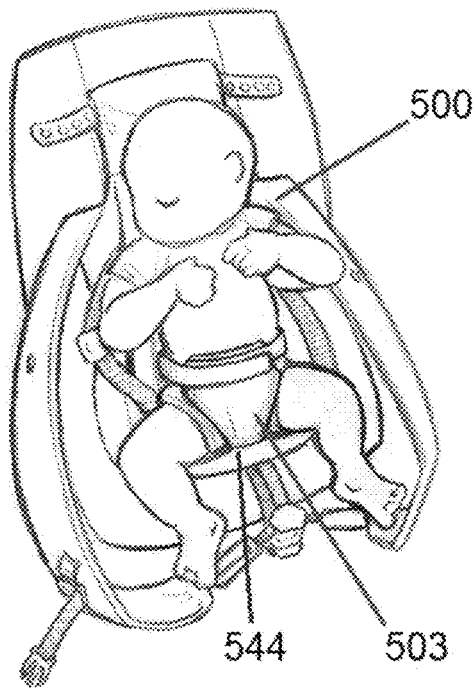
FIG. 22A  FIG. 22B
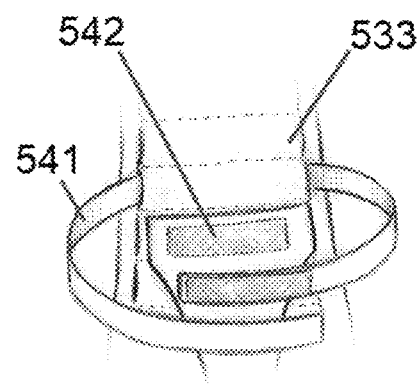
FIG. 22C

BABY CARRIER

CROSS-REFERENCE TO RELATED APPLICATIONS

This application is a continuation of U.S. patent application Ser. No. 17/931,544, filed on Sep. 12, 2022, which is a divisional of U.S. patent application Ser. No. 17/652,093, filed on Feb. 22, 2022 and issued as U.S. Pat. No. 11,440,444 on Sep. 13, 2022, which is a continuation-in-part of U.S. patent application Ser. No. 17/450,688, filed on Oct. 12, 2021, which is a continuation of U.S. patent application Ser. No. 17/334,654, filed on May 28, 2021, which is a continuation-in-part of U.S. patent application Ser. No. 17/149,711, filed on Jan. 14, 2021, which is a continuation of U.S. patent application Ser. No. 16/286,584, filed on Feb. 26, 2019, which is a continuation-in-part of PCT Patent Application No. PCT/US2017/048784, filed on Aug. 26, 2017, which claims the benefit of U.S. Provisional Patent Application Ser. No. 62/379,936, filed on Aug. 26, 2016, the disclosures of which are hereby incorporated in their entireties herein by reference.

BACKGROUND

Field of the Invention

The present disclosure relates to baby carriers.

Description of the Related Art

Back pain is a significant cause of morbidity in the United States and worldwide. In a 2010 study of the global burden of disease, low back pain was found to cause more global disability than any of the other 290 conditions studied (Hoy, D, et al. "The Global Burden of Low Back Pain: Estimates from the Global Burden of Disease 2010 Study," *Ann. Rheum. Dis., March* 2014). Back pain is highly prevalent during and after pregnancy, as 49% of women experience back pain at some point during pregnancy (Ostgaard, H. C., et al. "Prevalence of Back Pain in Pregnancy," *Spine*, May 1991, 549-52) and approximately 40% of women experience postpartum back pain (Ostgaard, H. C., et al. "Postpartum Low-Back Pain," *Spine*, January 1992, 53-5).

This high prevalence of back pain during and after pregnancy may be better understood in view of physiological changes occurring in a woman's body during pregnancy. As the body grows to adjust for the growth of the fetus, abdominal muscles stretch. This often causes a split, or diastasis, in the rectus abdominus. These abdominal muscles are critical to stabilization of the spine. In addition, the ligaments of the lumbar spine and pelvis loosen to allow for safe passage of the baby through the birth canal during birth. This reduces intrinsic spinal stability. Further, the S-shaped curve of the back increases, which puts additional pressure on the lumbar spine. Moreover, the pelvic floor muscles become stretched and often weakened. These muscles function as a crucial floor for the body's core musculature, and this muscular weakening results in a cascade effect that impacts the strength and stability of the spine. Finally, women are now becoming pregnant at older ages and there is a national increase in the rate of pregnancies of multiples (twins, triplets, etc.). As such, the baseline risk for back pain during and after pregnancy is increasing. These factors place women at increased risk for chronic back pain if their problems are not addressed early (see Fitzgerald, C. et al. "The Association Between Pelvic Girdle Pain and Pelvic Floor Muscle Function in Pregnancy," *Int. Urogynecol. J.*, July 2012, 893-8; Ritchie, J. "Orthopedic Considerations During Pregnancy," *Clinical ObGYN*, June 2003, 456-66). On account of these risk factors, women should be encouraged to minimize activities that increase the risk of back injury during the postpartum period.

While certainly convenient, the use of multi-functional infant car seats that may be removed from a vehicle and function as a baby carrier significantly increases the risk of postpartum back injuries in women. An average infant car seat weighs approximately 15 lbs. and is over 2 feet in length and 18 inches wide. When using a multi-functional infant car seat, caregivers are tasked with transferring the infant car seat in and out of the car while the infant remains in the car seat.

An evaluation of the physics of lifting demonstrates the significance of these weights and the potential for injury caused thereby. The farther an object is from the center of gravity of a person lifting the object, the more effort is required to lift the object—the moment that a force produces is a multiple of the distance of the object from the center of gravity of the object and the weight of the object. The weight of the infant car seat added to the weight of the infant results in increased pressure through the discs of the spine when this weight is carried further away from the body. Also, a person generally carries an infant car seat in front of or slightly to the side of the body, resulting in increased forces on the intervertebral discs in the anterior compartment of the lumbar spine, and thereby increasing the risk of disc herniation or injury. The spine and abdominal muscles are required to use very high forces to counterbalance the forward forces caused by the weight of an object. These muscles are already weak and stretched in the postpartum period, and thus the risk of injury is increased. Further, the weight of an infant car seat carried on one arm causes increased risk of injury to the carrying arm of a parent. This is in addition to the increased risk of carpal tunnel syndrome and other upper arm maladies from carrying infants without car seats.

Current trends in infant car seat manufacturing are focused on producing car seats with not only increased safety and stability on impact, but also increased versatility and ease of transport. These two considerations are often at odds with one another. Moreover, the very fact that infant car seats are easily removable from vehicles itself increases the risk of danger to infants in a collision. In addition, removability of infant car seats leads to an increased risk of improper installation or improper use. A 2009 study by the National Highway Traffic Safety Administration indicated that 73% of car seats were installed improperly, and nearly 84% of infant car seats were installed improperly (see "Misuse of Child Restraints," www.nhtsa.gov/About+NHTSA/Traffic+Techs/current/Misuse+Of+Child+Restraints).

Baby carriers are used to carry infants and toddlers on a person's body in situations where hands-free carrying is desirable or required. However, extended use of baby carriers is also well-known to cause back pain (see, e.g., "Babywearing: How to Prevent Baby Carrier Back Pain," www.thetot.com/baby/7-tips-to-prevent-back-pain-from-baby-wearing/).

U.S. Pat. No. 8,464,919 to Goozdich discloses an infant carrier system that includes an adjustable belt for attaching an infant carrier. U.S. Pat. No. 9,480,344 to Vialpando, et al. discloses a bimodal infant carrier that fits into a car seat. U.S.

Patent Application Publication No. 2008/0313812 to Reeves, et al. discloses an infant carrier that may be used in a car seat.

There remains a need for a baby carrier that reduces the risk of injury in pregnant and postpartum women while also providing both safety and convenience for the baby to be carried therein.

SUMMARY

A baby carrier system is disclosed herein. The baby carrier system includes a baby carrier and a waist strap. The baby carrier includes a main body, a baby securing system, and shoulder straps. The baby carrier may be a front-attaching baby carrier, a backpack-style baby carrier, a dual mode front-attaching or backpack-style baby carrier, or a handbag-style baby carrier.

In some preferred embodiments, the waist strap may be detachable. In alternate embodiments, the waist strap may be permanently attached to the baby carrier. The waist strap may preferably be adjustable. In some preferred embodiments, the baby carrier system may include a waist strap and a multi-functional baby carrier that is also configured for use as a car seat insert.

In such embodiments, the main body of the multi-functional baby carrier includes fastener slits that allow for a car seat harness, such as a five-point harness, to secure a baby when the fastener slits are unfastened. The multi-functional baby carrier functions as a baby carrier that is suitable for wearing on the body of a person, such as a caregiver, when the baby carrier is removed from the car seat. When a baby is removed from the car seat in the baby carrier, the baby's arms slide out of the unfastened car seat harness, which preferably remains in the car seat, and the baby is safely lifted in the baby carrier while remaining secured therein as the baby carrier is lifted out of the car seat. The fastener slits may then be zippered or otherwise fastened so that the multi-functional baby carrier may be adjusted according to the preferences of the caregiver or the baby. In some preferred embodiments, the waist strap may preferably be a separate component of the baby carrier system that is detachable and adjustable, so that that the multi-functional baby carrier may be reversibly attached to the waist strap and the waist strap may also be adjusted.

BRIEF DESCRIPTION OF THE DRAWINGS

FIG. 20A shows a horizontal stabilizer bar that provides semi-rigidity to the area of the main body of the baby carrier shown in FIG. 14 that is adjacent to the main body magnetic component.

FIG. 20B shows how the horizontal stabilizer bar shown in FIG. 20A promotes M-shaped relative positioning of the baby's hips and thighs when the baby is carried in the baby carrier.

FIG. 21 shows the waist strap securing system of the baby carrier shown in FIG. 14.

FIGS. 22A-C show the T-strap of the baby carrier shown in FIG. 14 secured by a T-strap fastening system.

DETAILED DESCRIPTION

Figure 1:
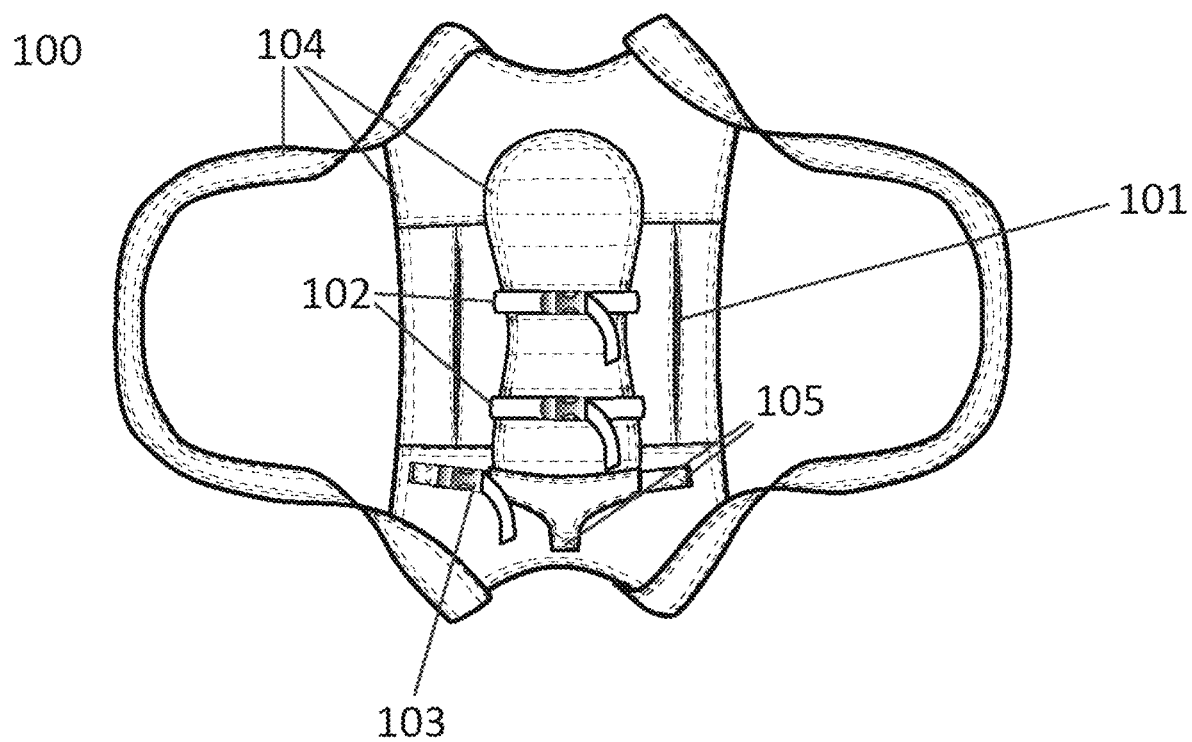
FIG. 1 shows an inside view of an embodiment of the baby carrier.

A baby carrier system is disclosed herein. The baby carrier system includes a baby carrier and a waist strap. The baby carrier includes a main body, a baby securing system, and shoulder straps. The baby carrier may be a front-attaching baby carrier, a backpack-style baby carrier, a dual mode front-attaching or backpack-style baby carrier, or a handbag-style baby carrier.

In some preferred embodiments, the waist strap may be detachable. In alternate embodiments, the waist strap may be permanently attached to the baby carrier. The waist strap may preferably be adjustable. In some preferred embodiments, the baby carrier system may include a waist strap and a multi-functional baby carrier that is also configured for use as a car seat insert.

In such embodiments, the main body of the multi-functional baby carrier includes fastener slits that allow for a car seat harness, such as a five-point harness, to secure a baby when the fastener slits are unfastened. The multi-functional baby carrier functions as a baby carrier that is suitable for wearing on the body of a person, such as a caregiver, when the baby carrier is removed from the car seat. When a baby is removed from the car seat in the baby carrier, the baby's arms slide out of the unfastened car seat harness, which preferably remains in the car seat, and the baby is safely lifted in the baby carrier while remaining secured therein as the baby carrier is lifted out of the car seat. The fastener slits may then be zippered or otherwise fastened so that the multi-functional baby carrier may be adjusted according to the preferences of the caregiver or the baby. When the fastener slits are fastened, the baby will be held close to the caregiver. This provides additional support to the baby, and may be particularly suitable for a younger baby who benefits from the additional support and security provided thereby. When the fastener slits are unfastened, maneuverability within the baby carrier is increased. This may be particularly suitable for an older baby. In some preferred embodiments, the waist strap may preferably be a separate component of the baby carrier system that is detachable and adjustable, so that that the multi-functional baby carrier may be reversibly attached to the waist strap and the waist strap may also be adjusted.

In some preferred embodiments, the fastener slits may be fastened and unfastened with a slit fastener system. The fastener slits may preferably be positioned at the intershoulder distance of the five-point harness of a car seat and thereby may allow for a car seat harness that includes a harness fastener to secure a baby into a car seat when the slits are unfastened. After the harness fastener is unfastened, the baby carrier may be removed from the car seat. When the baby carrier is removed from the car seat, the baby's arms slide out of the unfastened car seat harness and the harness remains in the car seat. The baby may thereby be safely lifted in the baby carrier.

In some embodiments, the slit fastener system may comprise a zipper. In other embodiments, the slit fastener system may comprise Velcro®. In other embodiments, the slit fastener system may comprise one or more buttons.

When the multi-functional baby carrier is used as a baby carrier, the fastener slits may optionally be closed to provide additional support, such as may be required for infants, or may be allowed to remain open to allow additional freedom of movement and proper positioning to provide optimal hip support for the baby, such as may be preferable for older babies.

The baby carrier includes a baby securing system. In some embodiments, the baby securing system is permanently secured to the main body of the baby carrier. In other embodiments, the baby securing system is reversibly secured to the main body of the baby carrier. In yet other embodiments, one or more components of the baby securing system are permanently secured to the main body of the baby carrier and one or more components of the baby securing system are reversibly secured to the main body of the baby carrier.

The baby securing system is configured to secure the torso of the baby between the baby securing system and the main body of the baby carrier. In some embodiments, the baby securing system may include one or more body straps to secure the torso of the baby, where the body straps may include body strap fasteners to fasten the body straps, and may also further include a T-strap to secure the waist and legs of the baby. In some preferred embodiments, the baby securing system may be composed of a T-strap without body straps, where the T-strap is configured to fully secure the baby in the baby carrier by securing the torso of the baby between the T-strap and the main body of the baby carrier.

The T-strap is composed of a T-strap connector and one or more T-strap fasteners. In some embodiments, the T-strap is composed of a single T-strap fastener and a T-strap connector. In some alternate embodiments, the T-strap is composed of two T-strap fasteners and a T-strap connector. In yet other alternate embodiments, the T-strap is composed of another suitable combination of T-strap fasteners and T-strap connectors. The one or more T-strap fasteners, which may be one or more straps or other suitable fasteners, may be connected to the T-strap connector via a T-strap fastener receiver that is affixed to and forms a part of the T-strap connector. The one or more T-strap fasteners and the T-strap fastener receiver together form a T-strap fastening system. The main body of the baby carrier may include a tunneling overlay, where the one or more T-strap fasteners may be threaded through any one of multiple tunnels in the tunneling overlay to adjust the T-strap for the height of the baby's waist. In embodiments with only a single T-strap fastener, the T-strap fastener may be secured to itself and to the T-strap connector. The T-strap connector is preferably permanently secured to the main body of the baby carrier at a T-strap connector attachment point. In embodiments with multiple T-strap fasteners, the T-strap fasteners may be permanently secured to the main body of the baby carrier. The one or more T-strap fasteners may, for example, be one or more Velcro® straps. The one or more Velcro® straps may preferably have double-sided Velcro® at one or both ends. In some preferred embodiments, the main body of the baby carrier includes a tunneling overlay and the T-strap is composed of (i) a single T-strap fastener that has doubled-sided Velcro® on one end and single-sided Velcro® on the other end, and (ii) a T-strap connector that has a T-strap fastener receiver composed of Velcro®. In such embodiments, to secure the T-strap, first the T-strap fastener is threaded through a tunnel of the tunneling overlay, next a first side of the double-sided Velcro® end of the T-strap fastener is fastened to the Velcro® T-strap fastener receiver, and then the single-sided Velcro® end of the T-strap fastener is fastened to a second side of the double-sided Velcro® end of the T-strap fastener that is opposite the first side. In such embodiments, all or substantially all of the Velcro® surfaces are fastened to each other, thereby minimizing the likelihood of snagging. The Velcro® straps may also preferably be soft and non-irritating to the baby.

In some alternative embodiments, the T-strap fasteners may include buckles that are used to fasten the T-strap.

The baby carrier also includes shoulder straps. The shoulder straps may preferably act as handles which may be held by a caregiver, such as a parent, when lifting a baby in the baby carrier. Each shoulder strap may include a padded upper shoulder strap that is the primary contact area with the caregiver's person when the baby carrier is worn by the caregiver and a shoulder strap connector, which may be unpadded webbing such as nylon or other suitable webbing, that extends between the padded section and the lower end of the main body of the baby carrier. The shoulder strap connectors may optionally include permanent or removable pads that cover a portion of the webbing. Each shoulder strap connector may be connected to a shoulder strap adjuster or, alternately, each upper shoulder strap may be connected to a shoulder strap adjuster. In an alternate embodiment, each shoulder strap connector may be directly connected to its corresponding upper shoulder strap. In some preferred embodiments, the shoulder straps may be reversibly separated into the upper shoulder straps and the shoulder strap connectors.

Each shoulder strap is preferably permanently secured to the main body of the baby carrier at a position that is at or proximal to the top of the main body. Each shoulder strap is also secured to the main body of the baby carrier, directly or indirectly, at a position that is at or proximal to the bottom of the main body. In embodiments where each shoulder strap is indirectly secured to the main body of the baby carrier at a position that is at or proximal to the bottom of the main body, the shoulder straps may be secured to a lower shoulder strap stabilizer that is secured to the main body at a lower shoulder strap stabilizer attachment point. The shoulder straps may be permanently secured to the lower shoulder strap stabilizer, or may alternatively be reversibly secured to the lower shoulder strap stabilizer.

In some preferred embodiments, the shoulder straps may be indirectly secured to the lower end of the main body of the baby carrier in close proximity to each other. The lower shoulder strap stabilizer may further secure the shoulder straps to each other and to the lower end of the main body of the baby carrier. The main body of the baby carrier may include a horizontal stabilizer bar, further discussed below, that is positioned near the lower end of the main body and that creates a wide base of support for a baby's hips and thighs when the baby is carried in the baby carrier. The lower shoulder strap stabilizer attaches to the lower end of the main body of the baby carrier, where the horizontal bar is positioned between the lower shoulder strap stabilizer attachment point and the T-strap connector attachment point. As a result, a baby secured in the baby carrier and positioned against a caregiver's body will automatically assume a position where the baby's hips are in a properly flexed and abducted posture. This may reduce the risk of hip dysplasia in the baby. In some preferred embodiments, the lower shoulder strap stabilizer may be permanently secured to the lower end of the main body of the baby carrier.

In some preferred embodiments, the lower shoulder strap stabilizer and shoulder strap connectors together form a Y-shaped component, alternately referred to as a Y-strap. In such embodiments, each shoulder strap is connected to the lower shoulder strap stabilizer through its shoulder strap connector.

In some embodiments, the shoulder strap connectors may be detachable from the lower shoulder strap stabilizer. In such embodiments, the main body of the baby carrier may further include shoulder strap side attachments on each side of its lower end. After detachment from the lower shoulder strap stabilizer, the shoulder strap connectors may be reattached to the main body of the baby carrier via the shoulder strap side attachments. This provides alternative positioning of the shoulder straps to maximize support and comfort during longer duration use of the baby carrier.

In some preferred embodiments, the operational length of the shoulder straps may be adjusted using a shoulder strap adjuster. As used herein, the term "operational length" refers to the effective length of a component while in use, and not the actual overall length. Thus any extra length of a component that is not in use is not considered part of the operational length.

In some preferred embodiments, each upper shoulder strap has a shoulder strap connector attachment that connects the upper shoulder strap to its corresponding shoulder strap connector. The shoulder strap connector attachment may be attached to a shoulder strap fastener or may be threaded through a shoulder strap adjuster. The shoulder strap connector attachment may be formed from unpadded webbing such as nylon or other suitable webbing.

In some embodiments, the operational length of a shoulder strap is adjusted by adjusting the operational length of its shoulder strap connector using a shoulder strap adjuster. In alternate embodiments, the operational length of a shoulder strap is adjusted by adjusting the operational length of the shoulder strap connector attachment using a shoulder strap adjuster rather than by adjusting the operational length of the shoulder strap connector.

In some embodiments, the upper shoulder straps may be detachable from the shoulder strap connectors. In such embodiments, each shoulder strap adjuster may include a shoulder strap fastener insert or a shoulder strap fastener receiver. The shoulder strap fastener insert and shoulder strap fastener receiver may be connected to form a reversibly securable shoulder strap fastener. The shoulder strap fastener may be the combination of a three-pronged clip and three-pronged clip receiver, or may be any other suitable fastener.

The shoulder strap adjuster may preferably be attached to the shoulder strap fastener insert, which may be a male three-pronged clip, as a one-piece molded component. Thus, the shoulder strap adjuster and the shoulder strap fastener insert may be one piece of the same two-piece shoulder strap fastener that includes: (1) a shoulder strap adjuster that is part of the shoulder strap fastener insert and (2) a shoulder strap fastener receiver. In such embodiments, in configurations where the shoulder strap adjusters are used to adjust the operational length of the shoulder strap connectors, the shoulder strap connectors are threaded through the corresponding shoulder strap adjusters and the shoulder strap fastener receivers are connected to the end of the shoulder strap connector attachments of the upper shoulder straps. Alternatively, in configurations where the shoulder strap adjusters are used to adjust the operational length of the upper shoulder straps, the shoulder strap connector attachments are threaded through the corresponding shoulder strap adjusters and the shoulder strap fastener receivers are connected to the end of the shoulder strap connectors.

In some embodiments, the upper shoulder straps may be secured to the handle of an infant car seat using upper shoulder strap car seat fasteners. In some such embodiments, the upper shoulder straps are detachable from the shoulder strap connectors, as described above. In such embodiments, the upper shoulder straps are detached from the shoulder strap connectors prior to securing the upper shoulder straps to the handle of the car seat. The upper shoulder strap car seat fasteners may be Velcro® fasteners, snap fasteners, three-pronged clip fasteners, or any other suitable fasteners. When a baby is seated in the baby carrier in its car seat insert mode that is secured in a car seat, the detached shoulder strap connectors may be tucked underneath the baby's legs so that they are not loose. Alternatively, the baby carrier may include one or two shoulder strap connector securing attachments to secure the shoulder strap connectors to the baby carrier.

The multi-functional baby carrier may be worn as a baby carrier by a caregiver, such as a parent, while a baby remains secured therein. Thus the caregiver does not have to remove the baby from the baby carrier when securing the baby carrier to his or her body after removing the baby from a car seat. The caregiver may thus reduce the disturbance caused to the baby, such as when the baby is sleeping or tired. The caregiver may in certain situations also not have to remove blankets or other accessories and may thus reduce exposure of the baby to adverse weather conditions when the baby is removed from a car seat in suboptimal weather. In addition, since the baby will already be securely fastened within the baby carrier, the caregiver will not need to secure the baby therein after the baby is removed from a car seat. This further reduces the disturbance caused to the baby.

In some preferred embodiments, the baby carrier may include exterior handles that may be held by a caregiver while the caregiver lifts a baby secured therein.

In some preferred embodiments, the waist strap may be adjustable. The waist strap is configured for use by a caregiver to secure the baby carrier to the caregiver's body. The adjustable waist strap may preferably include a waist strap fastener system that includes a waist strap fastener and a waist strap fastener receiver. In some embodiments, the waist strap may also include a removable lumbar support for use therewith.

The waist strap may preferably be detachable. In embodiments where the baby carrier is a multi-functional baby carrier, this reduces bulk when the baby carrier is used in a car seat as a car seat insert, because the waist strap is not coupled to the baby carrier when it is inserted in a car seat. The detachability of the waist strap also facilitates use of the multi-functional baby carrier as an easy-to-use baby carrier.

In alternate embodiments, the detachable waist strap is configured to be reversibly coupled to a baby carrier that does not include features that allow use of the baby carrier as a car seat insert.

The detachable waist strap may be reversibly secured to the main body of the baby carrier using a waist strap securing system. The waist strap securing system may include a magnetic attachment system with a mechanical release, such as for example a FIDLOCK® magnetic fastener system. The magnetic attachment system may include a main body magnetic component and a waist strap magnetic component that may be securely coupled and subsequently decoupled only through the application of mechanical force to the mechanical release. While the main body magnetic component and the waist strap magnetic component are initially coupled by magnetic attraction between the components, coupling the components generates a mechanical attachment there-between. Because of this mechanical attachment, decoupling the main body magnetic component and the waist strap magnetic component requires mechanical force rather than reversal of a simple magnetic coupling. Thus, the likelihood of accidental detachment is minimized. The mechanical release may be a pull detachment release that requires the application of moderate force to cause the magnetic attachment system to detach the waist strap from the main body of the baby carrier. Thus, the main body of the baby carrier is extremely unlikely to be accidentally detached from the waist strap, which enhances safety.

The main body magnetic component may be supported by a horizontal stabilizer bar attached to the main body of the baby carrier. The horizontal stabilizer bar creates a wide base of support for a baby's hips and thighs when the baby is carried in the baby carrier. The horizontal stabilizer bar positions the baby carrier to allow the main body of the baby carrier to support the baby's hips and thighs, thereby promoting M-shaped relative positioning of the baby's hips and thighs, facilitating support of the baby in an anatomically optimal position and preventing long-term use of the baby carrier from causing medical conditions for the baby such as hip dysplasia. The horizontal stabilizer bar may preferably be padded for cushioning.

In some embodiments, the detachable waist strap provides lower back support when worn separately or when worn attached to the main body of the baby carrier. The waist strap may preferably include padding for comfort.

In embodiments where the baby carrier is a multi-functional baby carrier, when a caregiver removes a baby from a car seat using the baby carrier, the caregiver will optimally hold onto both the baby and the shoulder strap connectors. In alternate embodiments where the detachable waist strap is configured to be reversibly coupled to a baby carrier that does not include features that allow use of the baby carrier as a car seat insert, the caregiver will secure the baby in the baby carrier prior to lifting the baby carrier. In such alternate embodiments, the caregiver will still optimally hold onto both the baby and the shoulder strap connectors.

When the caregiver holds onto both the baby and shoulder strap connectors while lifting the baby carrier, the horizontal stabilizer bar causes the baby's thighs to be separated and the main body magnetic component is positioned in an upright position, which properly positions the main body magnetic component and shoulder straps as the main body of the baby carrier is brought near the waist strap to connect it thereto. Further, the attachment of the lower shoulder strap stabilizer to the lower end of the main body of the baby carrier is a failsafe that protects the baby from a fall if the magnetic attachment system fails or if the baby carrier is accidentally detached from the waist strap. If a caregiver were to carry the baby using only the shoulder straps, the baby would not fall from the baby carrier. The caregiver would then have sufficient time to reattach the main body magnetic component to the waist strap magnetic component without endangering the baby. While the waist strap is designed to enhance comfortable carrying of the baby and appropriate hip support, this backup safety mechanism creates additional safety in case of mechanical failure.

In some preferred embodiments, the baby carrier may include an adjustable back strap which may be used by a caregiver to secure the baby carrier to his or her body. In some embodiments, the adjustable back strap may include padding for comfort.

In some highly preferred embodiments, the baby carrier may include an adjustable waist strap and an adjustable back strap which may be used by a caregiver to secure the baby carrier to his or her body.

In some embodiments, the upper shoulder strap car seat fasteners may also be fastened together to form an adjustable back strap.

The baby carrier may be composed of fabrics that are both thin and strong, such as performance or upholstery fabrics, to minimize bulk. This reduces the load on a caregiver who is carrying a baby in the baby carrier. In embodiments where the baby carrier is a multi-functional baby carrier, this also facilitates insertion of the baby carrier into a car seat without compromising safety.

In some embodiments, the baby carrier may further include baby head support stabilizers that stabilize a baby's head when the baby is lifted by an adult or other caregiver while secured in the baby carrier. The baby head support stabilizers may preferably be adjustable to accommodate babies of different sizes and ages. In some embodiments, the baby head support stabilizers may be adjusted using fasteners such as toggle cords and fastener locks such as slotted buttons.

The main body of the baby carrier may additionally include a substantially semi-rigid baby support member that may further support the head and torso of a baby and promote configurational integrity of the baby carrier when the baby is lifted by a caregiver therein. This may reduce the risk of hyperflexion or hyperextension of the baby's neck when the baby is lifted by a caregiver in the baby carrier.

In some embodiments, the baby carrier may further include an accessory connector loop and an accessory connector latch, whereby a detachable pouch accessory may be attached to the baby carrier using the accessory connector latch. In some embodiments, the detachable pouch accessory may have pockets on one or both sides.

In some preferred embodiments, the baby carrier may also include a head support pillow.

In some embodiments, the baby carrier may also include a detachable cross strap to facilitate carrying.

FIG. 1 shows an inside view of an embodiment 100 of a multi-functional baby carrier of the baby carrier system disclosed herein, with fastener slits 101, removable body straps 102, an inside bottom adjustable T-strap 103, primary stitching 104, and reinforced secondary stitching 105. The body straps 102 shown in FIG. 1 are fastened.

Figure 2:
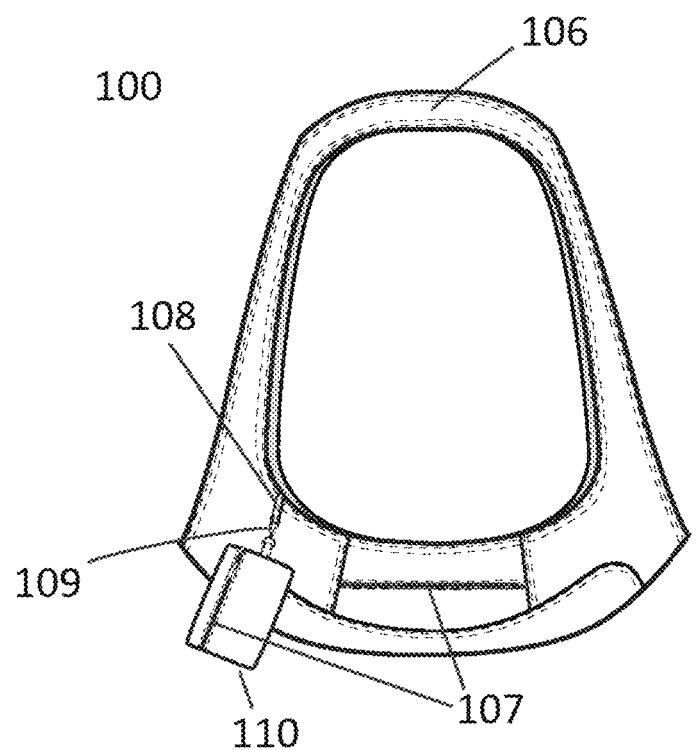
FIG. 2 shows a side view of the embodiment shown in FIG. 1.
Figure 3:
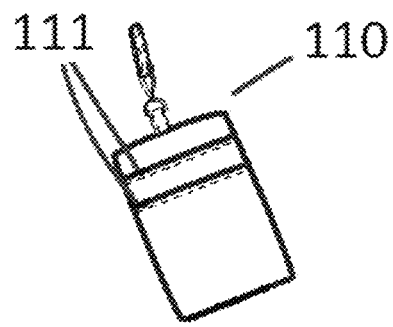
FIG. 3 shows an embodiment of a detachable pouch accessory.

FIG. 2 shows a side view of the embodiment 100 shown in FIG. 1, including shoulder straps 106, fasteners that are zippers 107, an accessory connector loop 108, an accessory connector latch 109, and a detachable pouch accessory 110. In some embodiments, the zippers may preferably be coil zippers and may also preferably be 7-8 gauge. In some embodiments, the detachable pouch accessory 110 may have pockets 111 on one side, as shown in FIG. 3.

Figure 4:
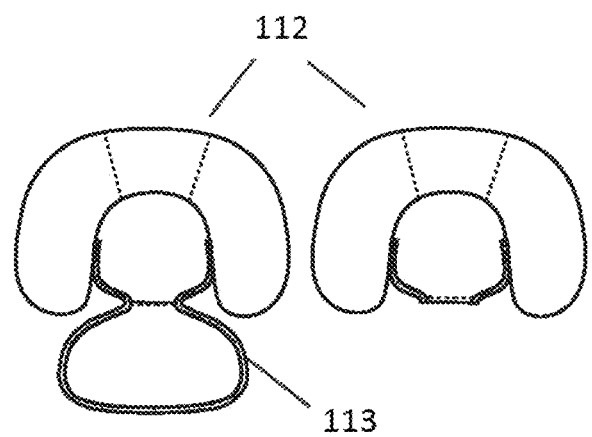
FIG. 4 shows an embodiment of a head support pillow.
Figure 5:
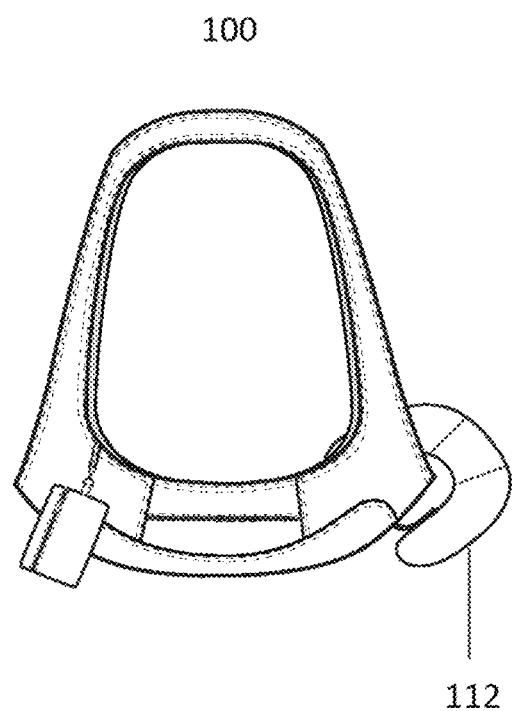
FIG. 5 shows an embodiment of a head support pillow secured to the baby carrier.

FIG. 4 shows an embodiment of a head support pillow 112. The head support pillow may include a binder 113 that may facilitate attachment of the head support pillow to the baby carrier when the baby carrier is placed on the floor. FIG. 5 shows an embodiment of the head support pillow 112 secured to the baby carrier 100.

Figure 6:
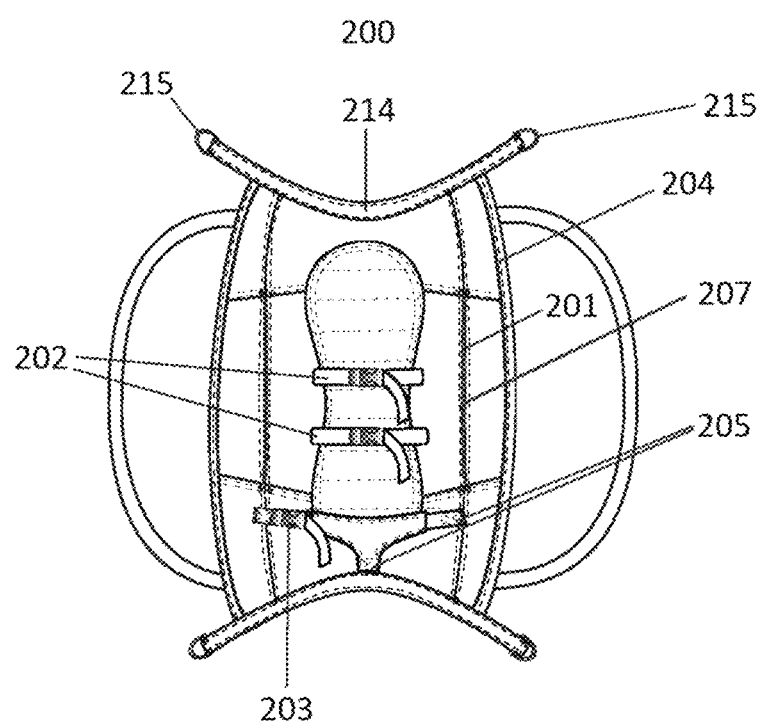
FIG. 6 shows an inside view of an embodiment of the disclosed baby carrier in a "canoe" style.

FIG. 6 shows an inside view of an embodiment 200 of a multi-functional baby carrier of the baby carrier system disclosed herein in a "canoe" style, with fastener slits 201 and fasteners that are zippers 207, removable body straps 202, an inside bottom adjustable T-strap 203, primary stitching 204, reinforced secondary stitching 205, and a D-ring strap 214 with D-rings 215 for securing a detachable cross strap (not shown).

Figure 7:
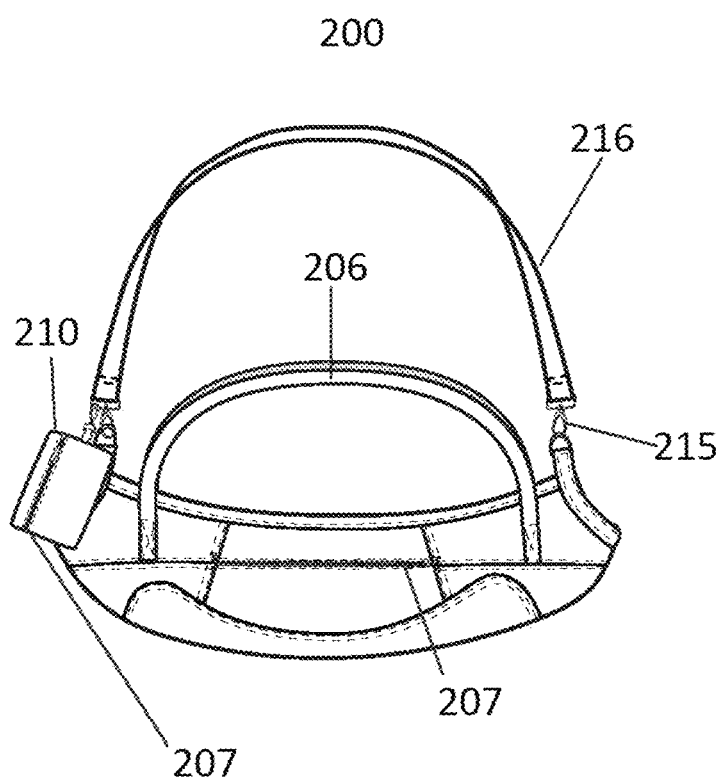
FIG. 7 shows a side view of the embodiment shown in FIG. 6.

FIG. 7 shows a side view of the embodiment 200 shown in FIG. 6, including shoulder straps 206, zippers 207, a detachable pouch accessory 210, D-rings 215, and a detachable cross strap 216. In some embodiments, the zippers may preferably be coil zippers and may also preferably be 7-8 gauge.

Figure 8:
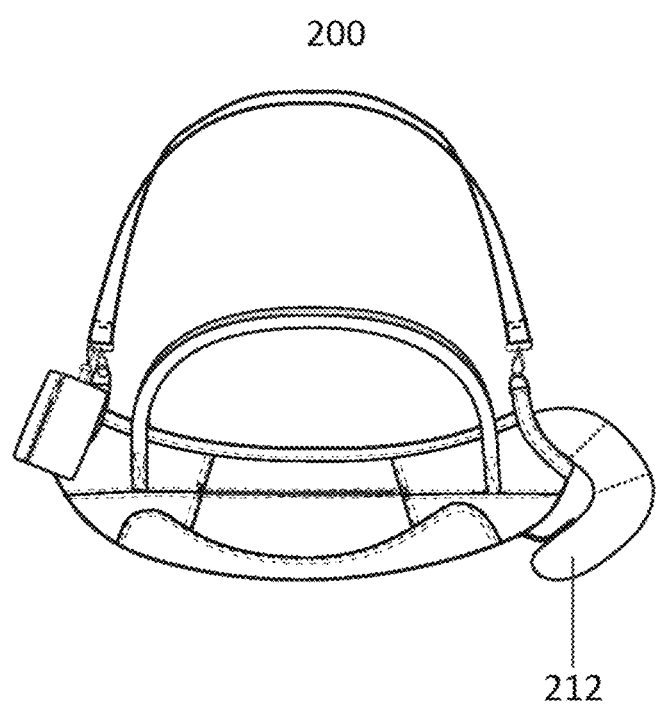
FIG. 8 shows an embodiment of a head support pillow secured to the baby carrier in a "canoe" style.

FIG. 8 shows an embodiment of a head support pillow 212 secured to the baby carrier 200.

Figure 9:
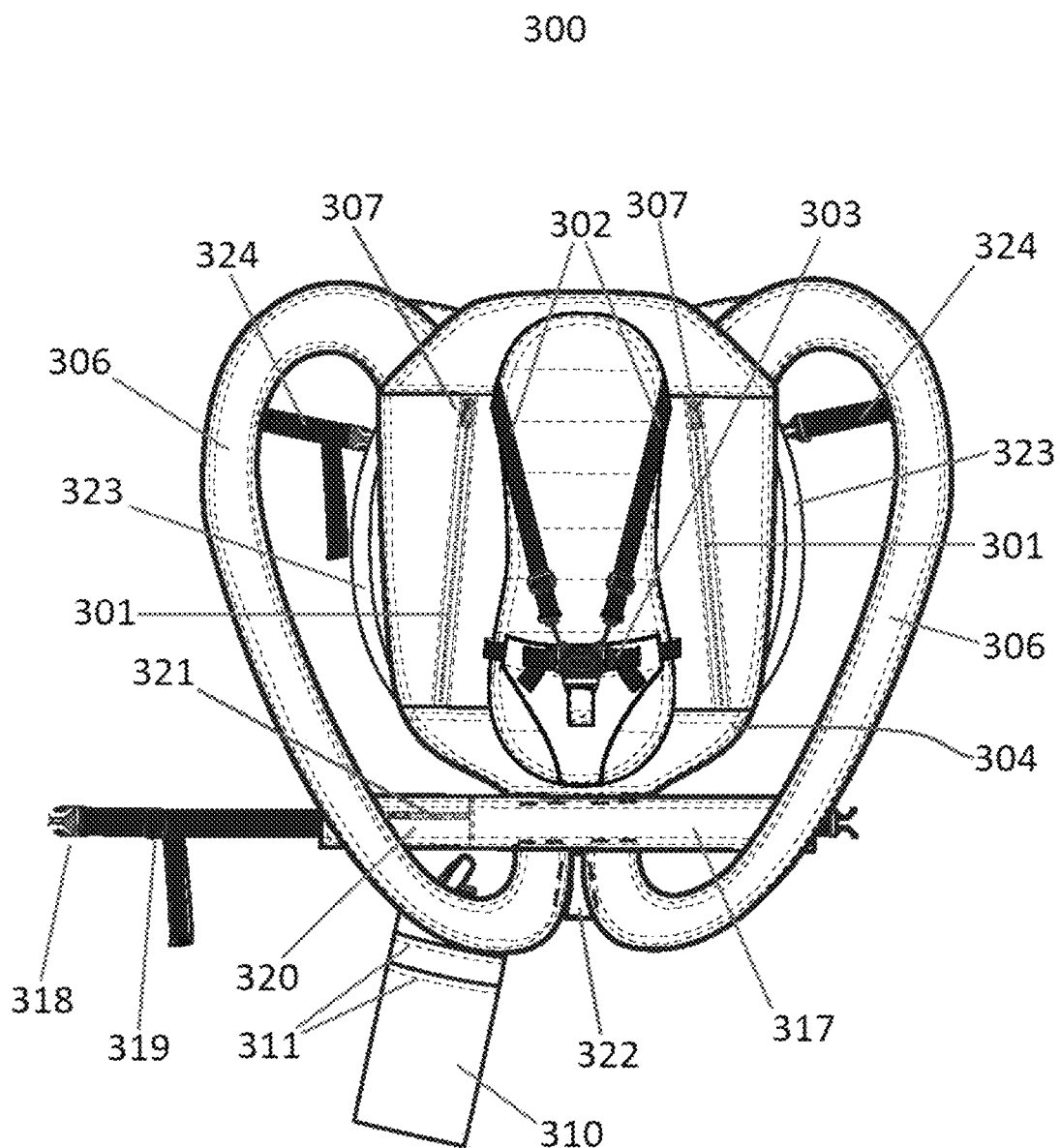
FIG. 9 shows an inside view of an embodiment of the baby carrier system.

FIG. 9 shows an inside view of an embodiment 300 of the multi-functional baby carrier system disclosed herein, with fastener slits 301 and fasteners that are zippers 307, body straps 302, an inside bottom adjustable T-strap 303, primary stitching 304, shoulder straps 306, a detachable pouch accessory 310, a waist strap 317, a waist strap fastener 318, a waist strap fastener adjuster 319, a waist strap pocket 320, a waist strap pocket fastener 321, a lower shoulder strap stabilizer 322, exterior handles 323, and an adjustable back strap 324. In some embodiments, the zippers may preferably be coil zippers and may also preferably be 7-8 gauge. In some embodiments, the detachable pouch accessory 310 may have pockets 311 on one side.

Figure 10:
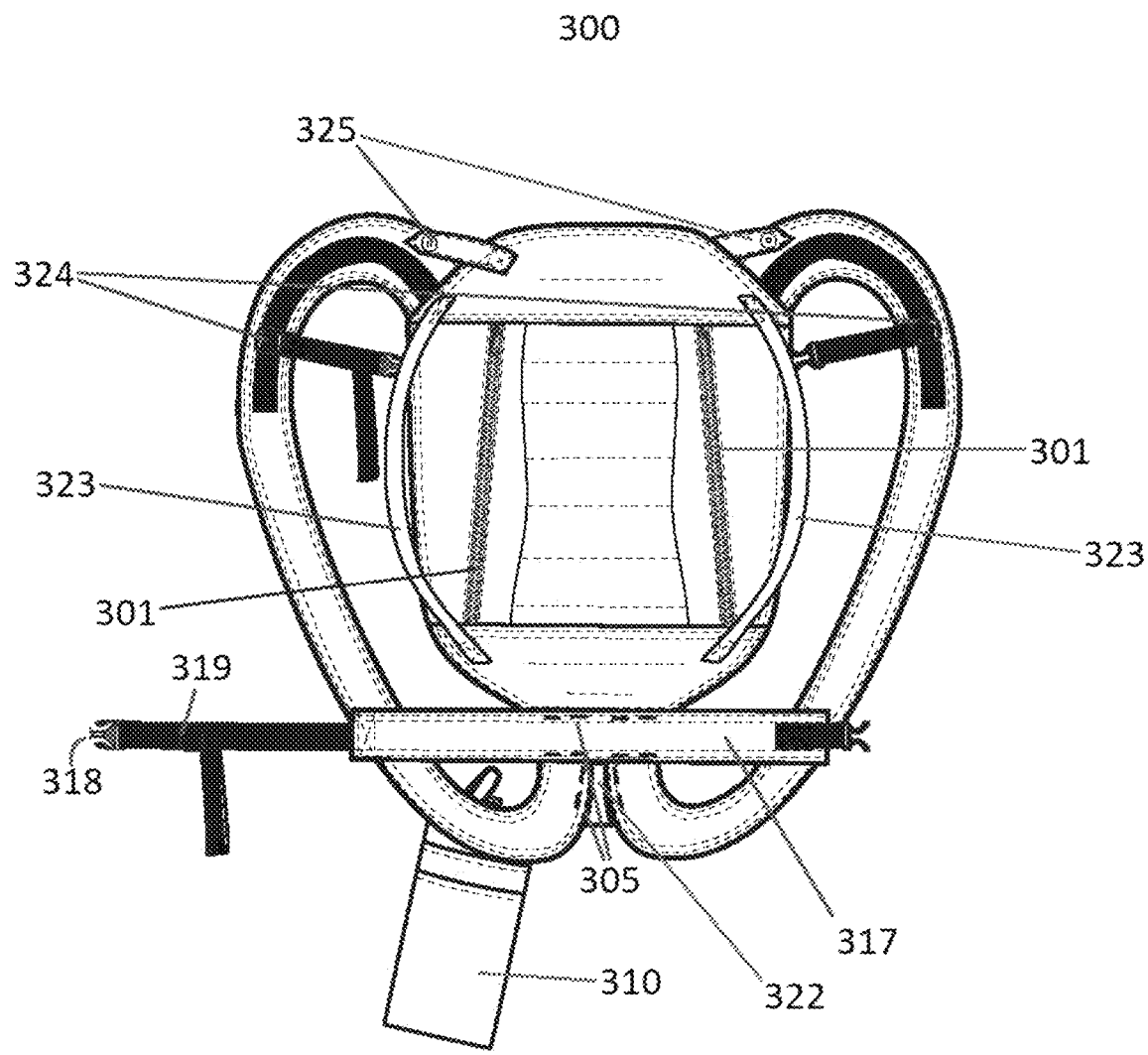
FIG. 10 shows an outside view of the embodiment shown in FIG. 9.

FIG. 10 shows an outside view of the embodiment 300 shown in FIG. 9, with fastener slits 301, shoulder straps 306, a detachable pouch accessory 310, a waist strap 317, a waist strap fastener 318, a waist strap fastener adjuster 319, a lower shoulder strap stabilizer 322, exterior handles 323, an adjustable back strap 324, and baby head support stabilizers 325.

Figure 11:
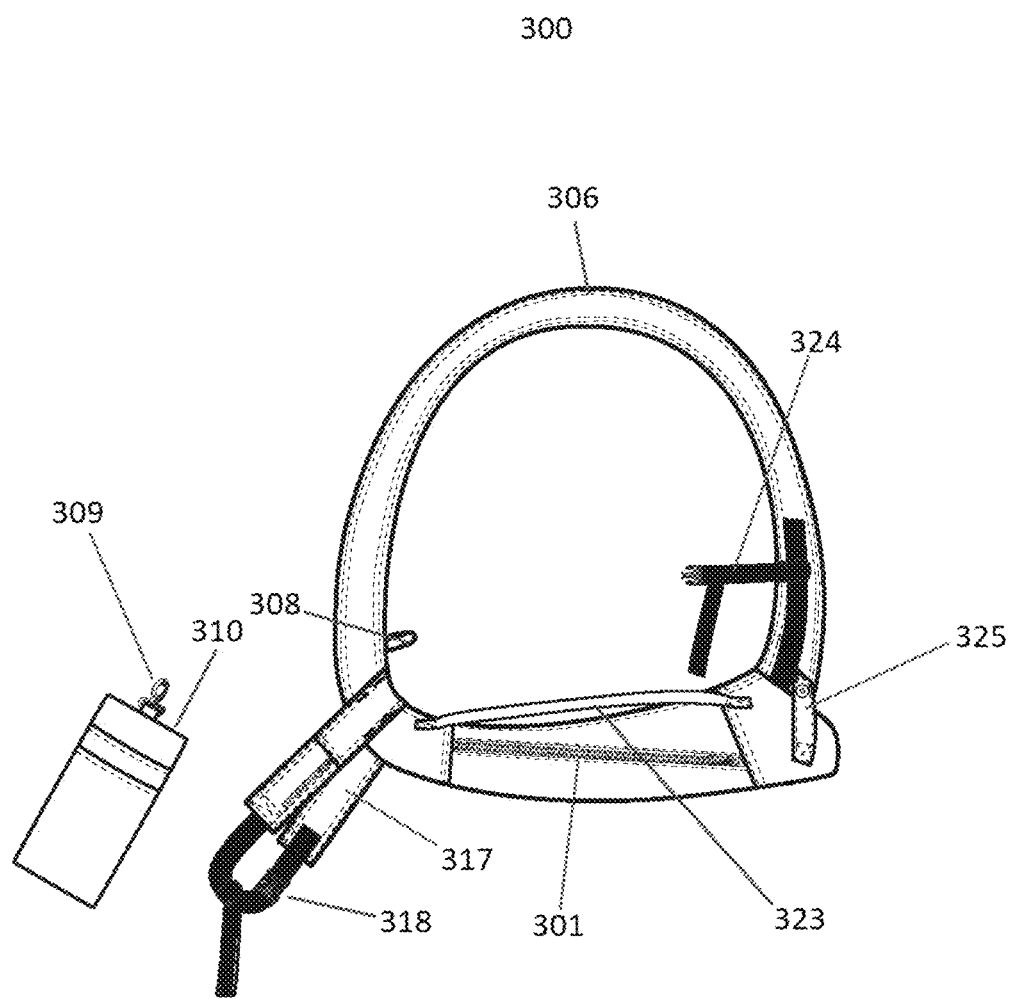
FIG. 11 shows a side view of the embodiment shown in FIG. 9.

FIG. 11 shows a side view of the embodiment 300 shown in FIG. 9, with fastener slits 301, shoulder straps 306, an accessory connector loop 308, an accessory connector latch 309, a detachable pouch accessory 310, a waist strap 317, a waist strap fastener 318, exterior handles 323, an adjustable back strap 324, and baby head support stabilizers 325.

Figure 12:
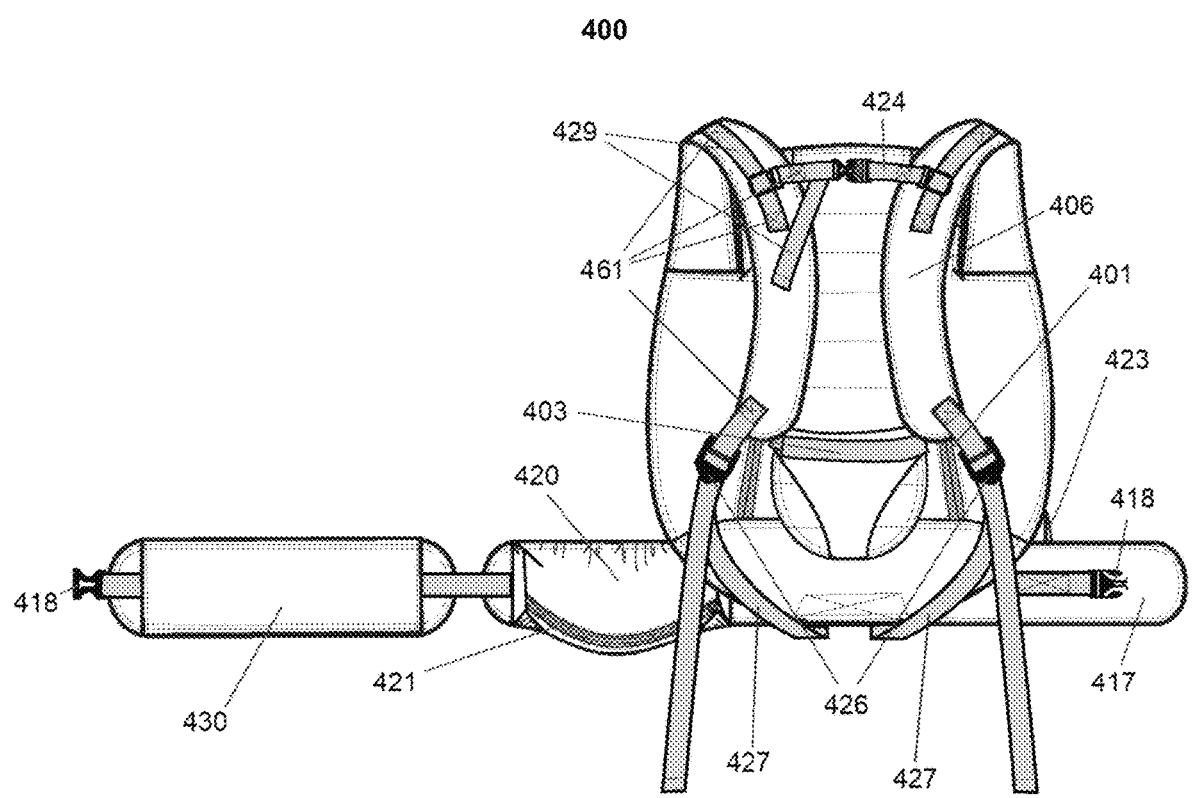
FIG. 12 shows an inside view of an embodiment of the baby carrier system.

FIG. 12 shows an inside view of an embodiment 400 of the multi-functional baby carrier system disclosed herein, with fastener slits 401, an inside bottom adjustable T-strap 403, shoulder straps 406, a waist strap 417, a waist strap fastener 418, a waist strap pocket 420, a waist strap pocket fastener 421, exterior handles 423, an adjustable back strap 424, shoulder strap adjusters 426, shoulder strap connectors 427, back strap adjusters 429, a removable lumbar support 430, and reinforced secondary box stitching 461.

Figure 13:
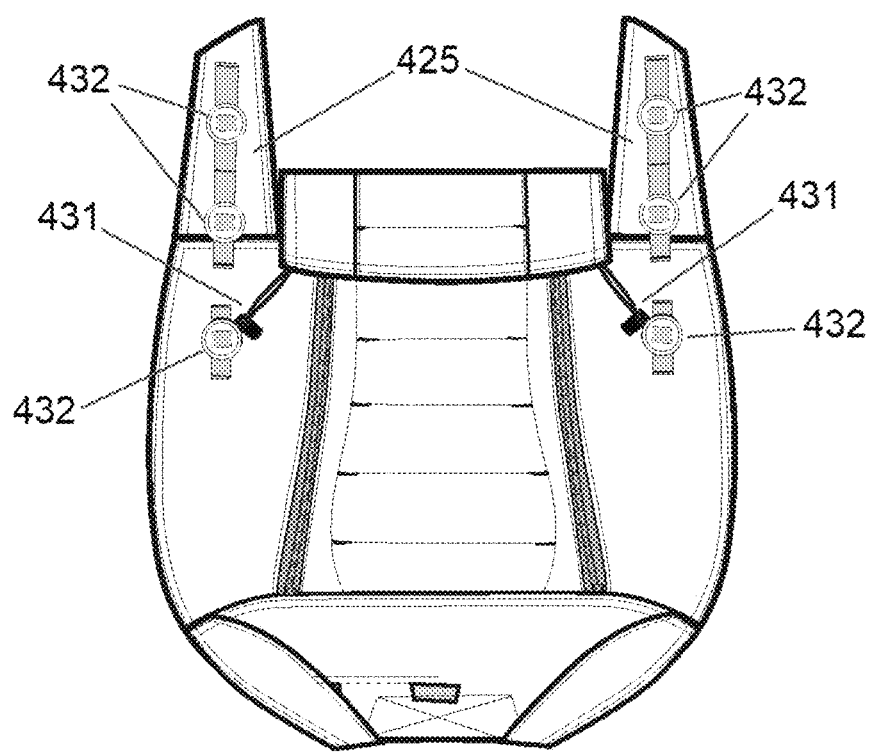
FIG. 13 shows an inside view of the embodiment shown in FIG. 12 with the shoulder straps not shown.

FIG. 13 shows an inside view of embodiment 400 with the shoulder straps not shown, including baby head support stabilizers 425, baby head support stabilizer fasteners 431, and baby head support stabilizer fastener locks 432.

Figure 14:
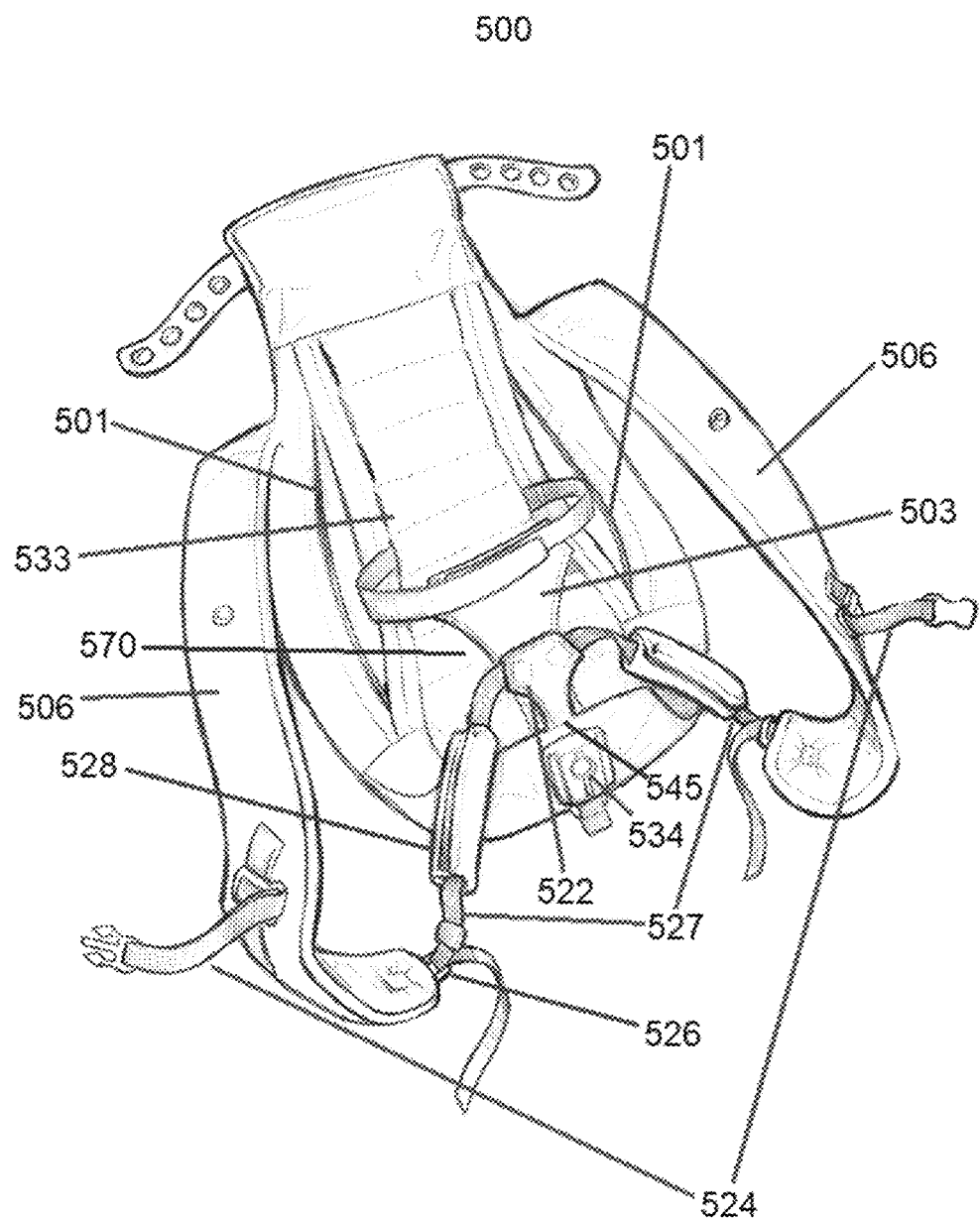
FIG. 14 shows an inside view of an embodiment of the multi-functional baby carrier.

FIG. 14 shows an inside view of an embodiment 500 of a multi-functional baby carrier of the baby carrier system disclosed herein, with fastener slits 501, an adjustable T-strap 503, shoulder straps 506, a lower shoulder strap stabilizer 522 which is attached to the main body 570 of the baby carrier at a lower shoulder strap stabilizer attachment point 545, an adjustable back strap 524, shoulder strap adjusters 526, shoulder strap connectors 527, removable shoulder strap connector padding 528, a tunneling overlay 533, and a main body magnetic component 534.

Figure 15:
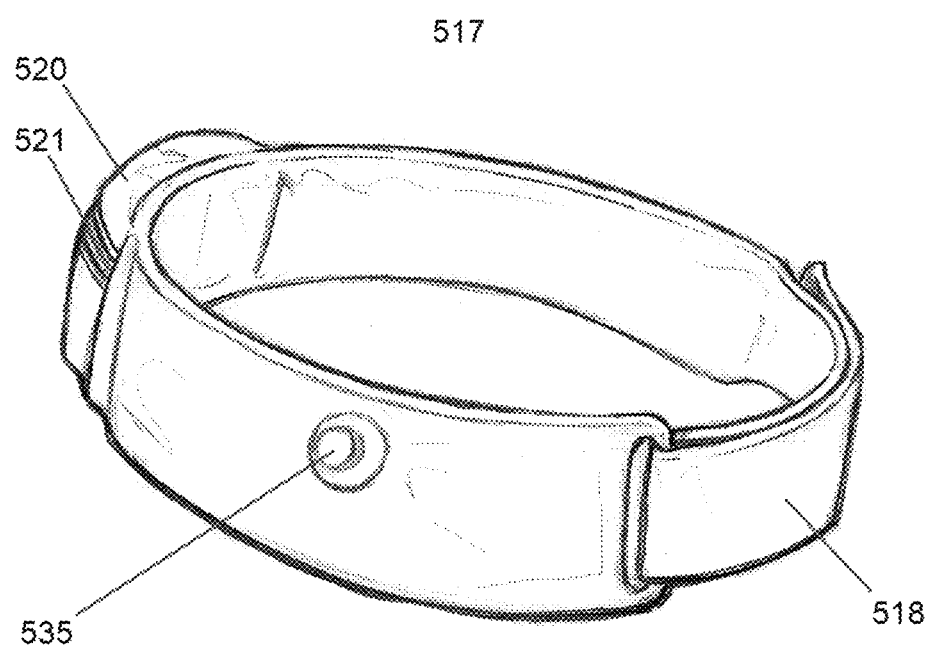
FIG. 15 shows an embodiment of a detachable waist strap that is coupled with the embodiment of the baby carrier shown in FIG. 14 to form an embodiment of the baby carrier system.

FIG. 15 shows a detachable waist strap 517 that is coupled with the embodiment of the baby carrier shown in FIG. 14 to form an embodiment of the baby carrier system. The detachable waist strap includes a waist strap adjuster 518, a waist strap pocket 520, a waist strap pocket fastener 521, and a waist strap magnetic component 535.

Figure 16:
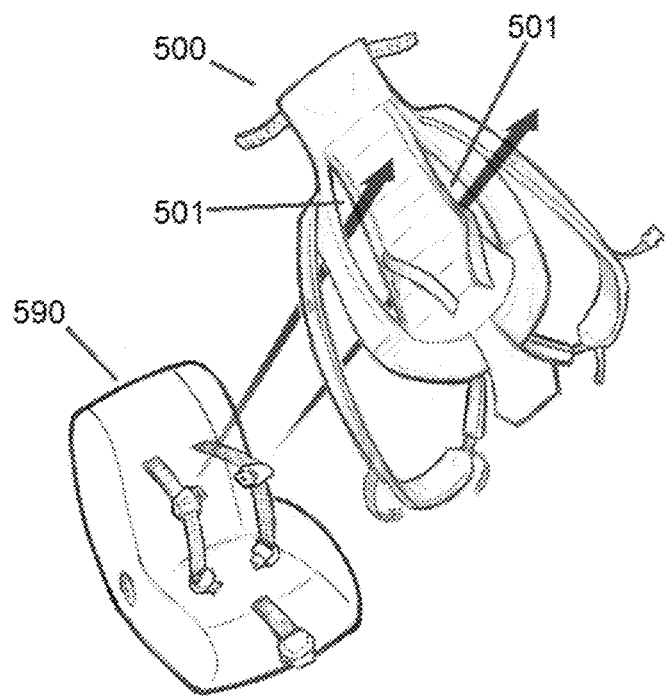
FIG. 16 shows how the baby carrier shown in FIG. 14 is secured in a car seat.
Figure 17:
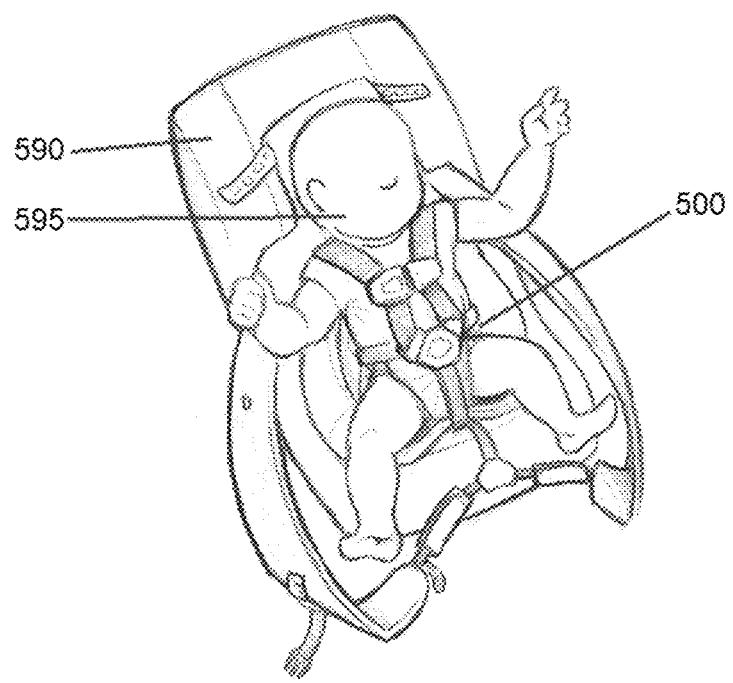
FIG. 17 shows a baby secured in a car seat in the baby carrier shown in FIG. 14.
Figures 18A, 18B:
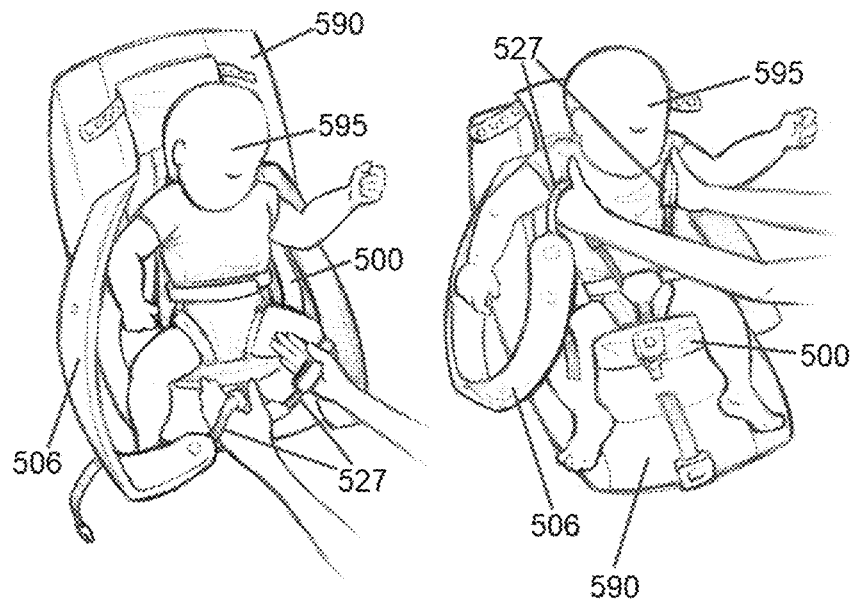
FIGS. 18A-B show how a baby is safely removed from a car seat by holding both the baby and the shoulder strap connectors of the shoulder straps of the baby carrier shown in FIG. 14.

FIG. 16 shows how the baby carrier 500 shown in FIG. 14 is secured in a car seat 590 with the fastener slits 501 opened. FIG. 17 shows a baby 595 secured in the car seat 590 and the baby carrier 500. FIGS. 18A-B show how the baby 595 is safely removed from the car seat 590 by holding both the baby 595 and the shoulder strap connectors 527 of the shoulder straps 506 of the baby carrier 500.

Figure 19:
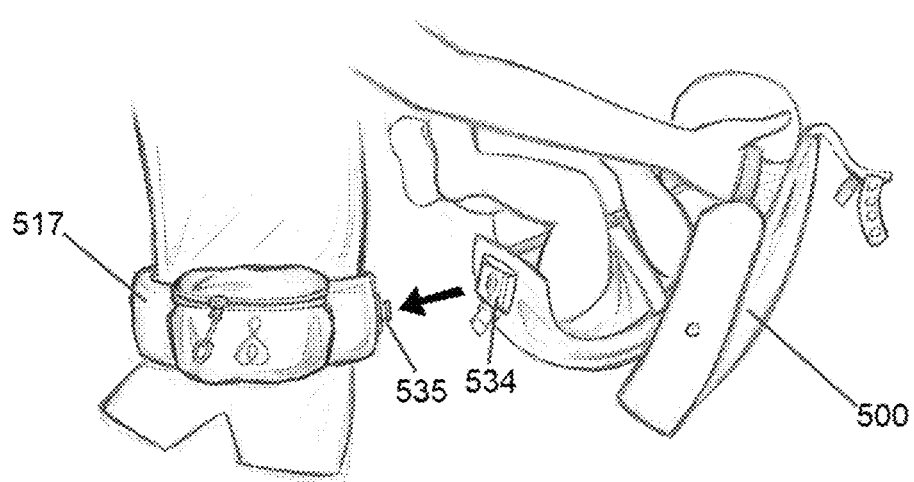
FIG. 19 shows how the main body magnetic component and the waist strap magnetic component are coupled while a baby is held in the baby carrier shown in FIG. 14 and the waist strap shown in FIG. 15 is worn by a caregiver.

FIG. 19 shows how the main body magnetic component 534 and the waist strap magnetic component 535 are coupled while the baby is held in the baby carrier shown in FIG. 14 and the waist strap shown in FIG. 15 is worn by a caregiver.

FIG. 20A shows a horizontal stabilizer bar 538 that provides semi-rigidity to the area of the main body of the baby carrier shown in FIG. 14 that is adjacent to the main body magnetic component 534. The horizontal stabilizer bar creates a wide base of support for a baby's hips and thighs when the baby is carried in the baby carrier, as discussed above. FIG. 20B shows how the horizontal stabilizer bar shown in FIG. 20A promotes M-shaped relative positioning of the baby's hips and thighs when the baby is carried in the baby carrier.

FIG. 21 shows the main body magnetic component and the waist strap magnetic component of the baby carrier shown in FIG. 14 coupled by magnetic attraction to form a waist strap securing system 536. The waist strap securing system may be decoupled only through the application of mechanical force to a mechanical release 537.

FIGS. 22A-C show the T-strap 503 of the baby carrier 500 shown in FIG. 14 secured by a T-strap fastening system. The T-strap is composed of a T-strap fastener 541 and a T-strap connector 543. The T-strap fastening system is composed of a T-strap fastener 541 and a T-strap fastener receiver 542 that is permanently affixed to and forms a part of the T-strap connector 543. The T-strap connector 543 is connected to the main body of the baby carrier at a T-strap connector attachment point 544. The T-strap fastener 541 has double-sided Velcro® on one end of the strap and single-sided Velcro® on the other end of the strap, such that the T-strap fastener 541 may be reversibly secured to itself. The T-strap fastener 541 is secured to the main body of the baby carrier by threading through a suitable tunnel of the tunneling overlay 533. The T-strap fastener receiver 542 is also formed from Velcro® in embodiment 500.

Figure 23:
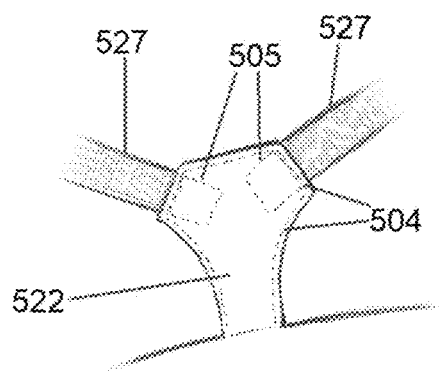
FIG. 23 shows primary stitching and reinforced secondary stitching that secures the shoulder strap connectors to the lower shoulder strap stabilizer of the baby carrier shown in FIG. 14.

FIG. 23 shows primary stitching 504 and reinforced secondary stitching 505 that secures the shoulder strap connectors 527 to the lower shoulder strap stabilizer 522 of the baby carrier shown in FIG. 14.

Figure 24:
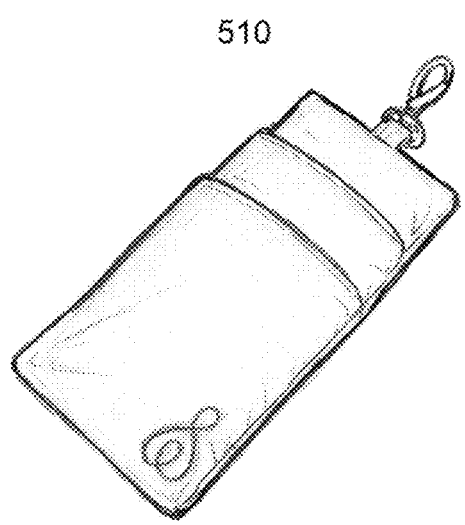
FIG. 24 shows a detachable pouch accessory.

In some embodiments, a detachable pouch accessory such as the embodiment 510 shown in FIG. 24 may be provided with embodiments 400 and 500.

Figure 25:
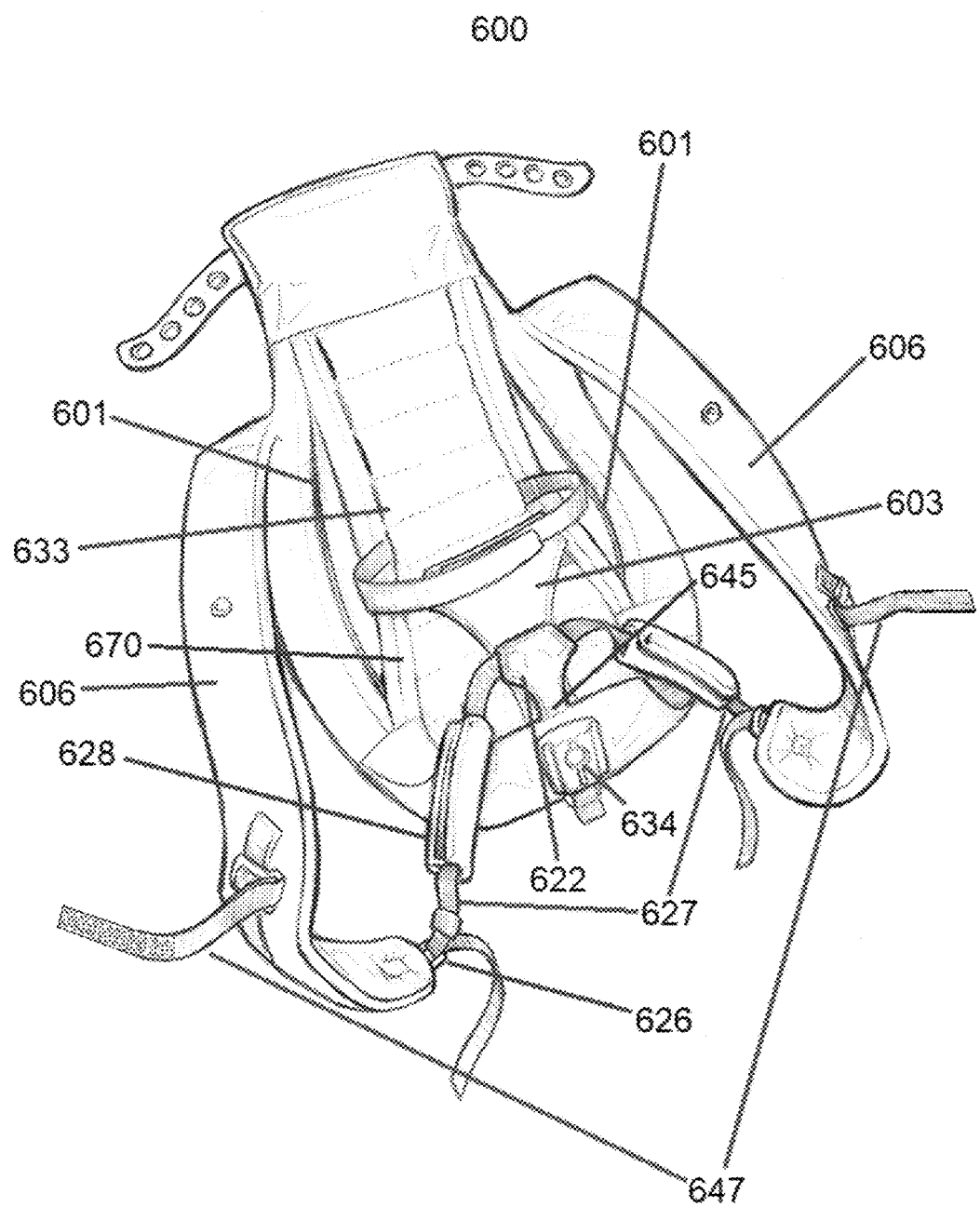
FIG. 25 shows an embodiment of the multi-functional baby carrier with upper shoulder strap car seat fasteners that may also function as a back strap.

FIG. 25 shows an inside view of an embodiment 600 of a multi-functional baby carrier that has the same overall design as embodiment 500, except that the back strap of embodiment 500 is replaced with upper shoulder strap car seat fasteners 647 that may be combined to form an adjustable back strap when the multi-functional baby carrier is used as a baby carrier. The embodiment 600 has fastener slits 601, an adjustable T-strap 603, shoulder straps 606, a lower shoulder strap stabilizer 622 which is attached to the main body 670 of the baby carrier at a lower shoulder strap stabilizer attachment point 645, an adjustable back strap formed from upper shoulder strap car seat fasteners 647, shoulder strap adjusters 626, shoulder strap connectors 627, removable shoulder strap connector padding 628, a tunneling overlay 633, and a main body magnetic component 634.

Figure 26A:
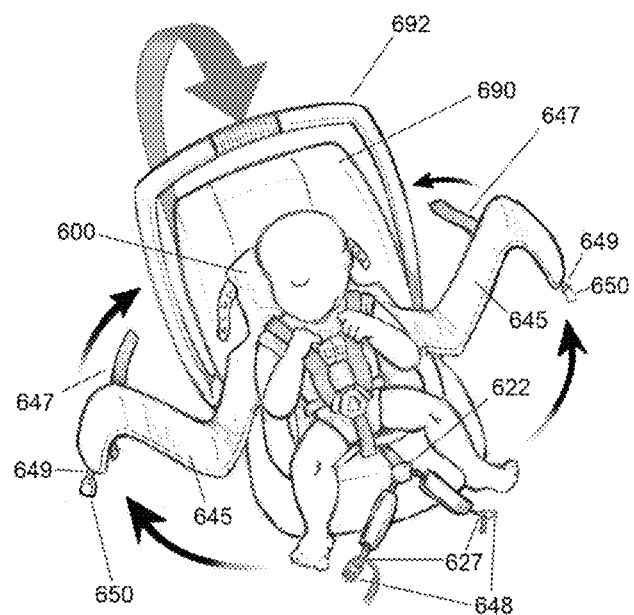
FIGS. 26A-B show the embodiment of the multi-functional baby carrier shown in FIG. 25.
Figure 26B:
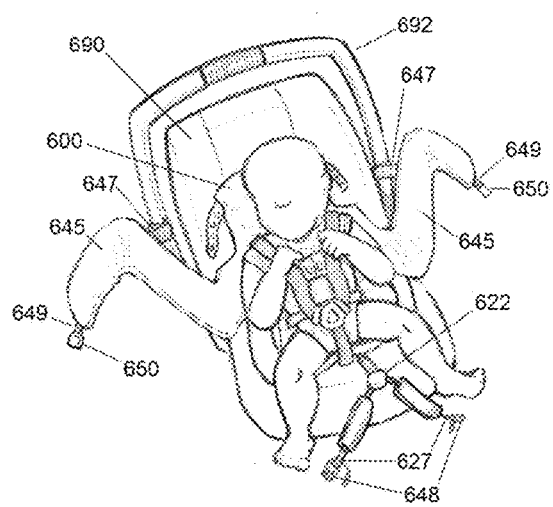
Figure 26C:
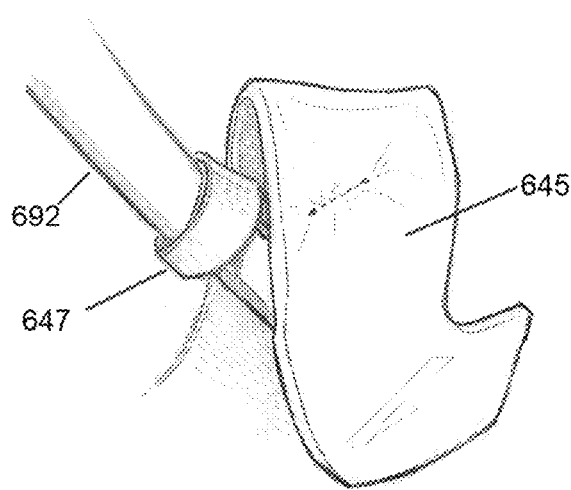
FIG. 26C shows a close view of an upper shoulder strap car seat fastener of the embodiment in FIGS. 26A-B.

FIGS. 26A-C show the embodiment 600 with the shoulder straps separated into upper shoulder straps 645 and shoulder strap connectors 627, where the shoulder strap connectors 627 and a lower shoulder strap stabilizer 622 together form a Y-strap. FIGS. 26A-B shows how the upper shoulder strap car seat fasteners 647 are used to fasten the upper shoulder straps 645 of the multi-functional baby carrier 600 to the handle 692 of an infant car seat 690. The shoulder strap connectors 627 are attached to a lower shoulder strap stabilizer 622 and are also threaded through shoulder strap adjusters that have shoulder strap fastener inserts 648 connected thereto as part of a one-piece component. The upper shoulder straps 645 have shoulder strap connector attachments 649 that have shoulder strap fastener receivers 650 at the ends thereof. The shoulder strap connector attachments 649 are affixed to the upper shoulder straps 645 and are used to fasten the upper shoulder straps to the corresponding shoulder strap connectors 627 when the multi-functional baby carrier is used as a baby carrier.

FIG. 26C shows a close view of an upper shoulder strap car seat fastener 647 attached to an infant car seat handle 692 and thereby securing the corresponding upper shoulder strap 645. The shoulder strap connector attachments are not shown in FIG. 26C.

Figure 27:
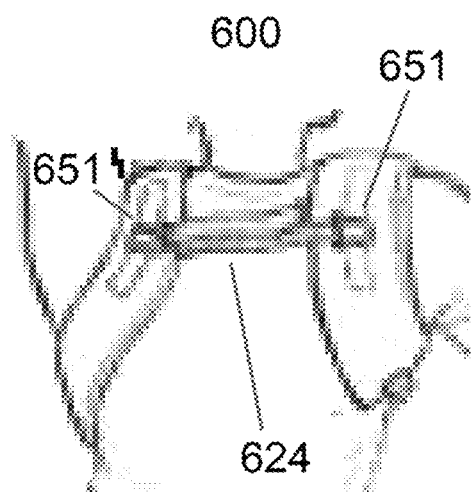
FIG. 27 shows the embodiment shown in FIG. 25 with the upper shoulder strap car seat fasteners combined to form an adjustable back strap.

FIG. 27 shows the embodiment 600 with the upper shoulder strap car seat fasteners combined to form an adjustable back strap 624. The upper shoulder strap car seat fasteners are Velcro® fasteners. The adjustable back strap 624 has back strap adjusters 651 for adjustment of the back strap as desirable.

The multi-functional baby carrier disclosed herein is configured to readily be inserted into and removed from an infant car seat. In some embodiments, the multi-functional baby carrier may be directly secured into an infant car seat using the harness system of the infant car seat.

The disclosed multi-functional baby carrier addresses the aforementioned inherent ergonomic disadvantages of carrying an infant car seat. The disclosed multi-functional baby carrier is a single function, easy-to-use car seat insert and baby carrier intended to facilitate transfer of babies in and out of car seats and provide proper support for a caregiver carrying a baby. By trending away from the current industry focus on multi-functionality of car seats and shifting multi-functionality to the comparably very lightweight baby carrier, the disclosed multi-functional baby carrier allows manufacturers of infant car seats to focus on safety features and deemphasize overall product weight because of the separation of the car seat and baby carrier functions.

The weight of the disclosed multi-functional baby carrier is minimal compared to that of a car seat, allowing a caregiver to transfer a baby into and out of a car seat without the additional significant weight and bulk of the infant car seat itself. Since the disclosed multi-functional baby carrier is soft and flexible, it conforms more easily to the body of the caregiver carrying the baby and allows the caregiver to transport the baby closer to the body and in a more natural position, mimicking traditional baby carriers. The softness and flexibility of the disclosed multi-purpose baby carrier also conforms more easily to the baby and accommodates the baby's growth. In addition, the multi-functional baby carrier increases the ease of baby transfer between the car seat and other baby products or desired locations such as strollers, cribs, or other products or locations.

The disclosed baby carrier may be configured for use in a front carry inward-facing mode, where a caregiver carries a baby who is facing toward the caregiver on the caregiver's front side. The disclosed baby carrier may also optionally be configured for use in a front carry outward-facing mode, where a caregiver carries a baby who is facing away from the caregiver on the caregiver's front side, or a backpack mode, where a caregiver carries a baby who is facing toward the caregiver on the caregiver's back side. In embodiments where the baby carrier is a multi-functional baby carrier, the fastener slits may be closed in the front carry outward-facing and backpack modes to enhance safety.

A method of lifting a baby secured in a baby carrier from a secure location and securing the baby within the baby carrier to a caregiver is also disclosed herein. The caregiver uses the caregiver's waist, torso, shoulders, and arms to secure the baby. The baby carrier has a main body and shoulder straps connected to the main body, where the shoulder straps include upper shoulder straps and shoulder strap connectors. The baby carrier is part of a baby carrier system that also includes a reversibly securable waist strap, where the waist strap includes a waist strap securing system. The method includes at least the following steps in order:
    a. attaching the waist strap to the caregiver;
    b. grasping the shoulder strap connectors;
    c. lifting the baby within the baby carrier while continuing to grasp the shoulder strap connectors;
    d. attaching the baby carrier to the waist strap using the waist strap securing system; and e. placing the shoulder straps over the shoulders of the caregiver.

In some embodiments, the secure location may be a car seat with a five-point harness. In such embodiments, prior to step (b), the car seat is unsecured, such as by unbuckling, and the harness is disconnected from the baby carrier by pulling the harness through the fastener slits.

The previous description of the disclosed embodiments is provided to enable any person skilled in the art to make or use the invention disclosed herein. Although the various inventive aspects are disclosed in the context of certain illustrated embodiments, implementations, and examples, it should be understood by those skilled in the art that the invention extends beyond the specifically disclosed embodiments to other alternative embodiments and/or uses of the invention and obvious modifications and equivalents thereof. In addition, while a number of variations of various inventive aspects have been shown and described in detail, other modifications that are within their scope will be readily apparent to those skilled in the art based upon reviewing this disclosure. It should be also understood that the scope of this disclosure includes the various combinations or sub-combinations of the specific features and aspects of the embodiments disclosed herein, such that the various features, modes of implementation, and aspects of the disclosed subject matter may be combined with or substituted for one another. The generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Similarly, the disclosure is not to be interpreted as reflecting an intent that any claim set forth below requires more features than are expressly recited in that claim. Rather, as the following claims reflect, inventive aspects may reside in a combination of fewer than all features of any single foregoing disclosed embodiment.

Each of the foregoing and various aspects, together with those set forth in the claims and summarized above or otherwise disclosed herein, including the figures, may be combined without limitation to form claims for a device, apparatus, system, method of manufacture, and/or method of use.

All references cited herein are hereby expressly incorporated by reference.

What is claimed is:

1. A baby carrier system comprising:
   a. a baby carrier comprising:
      i. a main body that includes a top and a bottom;
      ii. a baby securing system configured to secure a torso of a baby between the baby securing system and the main body; and
      iii. one or more shoulder straps; and
   b. a waist strap;
   wherein the waist strap may be releasably attached to the baby carrier using a waist strap securing system that comprises a magnetic attachment system,
   wherein the magnetic attachment system releasably attaches the baby carrier to the waist strap via a releasable attachment between a main body magnetic component and a waist strap magnetic component,
   wherein the releasable attachment between the main body magnetic component and the waist strap magnetic component is the only point of attachment between the baby carrier and the waist strap,
   wherein each shoulder strap is permanently secured to the main body at or near the top of the main body, and
   wherein each shoulder strap is releasably or permanently secured directly or indirectly to the main body at or near the bottom of the main body.

2. The baby carrier system of claim 1, wherein the baby carrier is a multi-functional baby carrier, wherein the main body of the baby carrier includes fastener slits that enable the baby carrier to be reversibly secured to a car seat.

3. The baby carrier system of claim 1, wherein the baby carrier further comprises a lower shoulder strap stabilizer, wherein each shoulder strap is releasably or permanently secured to the lower shoulder strap stabilizer and wherein the lower shoulder strap stabilizer is permanently secured to the main body near the bottom of the main body at a lower shoulder strap stabilizer attachment point, whereby each shoulder strap is indirectly secured to the main body.

4. The baby carrier system of claim 2, wherein the baby carrier further comprises a lower shoulder strap stabilizer, wherein each shoulder strap is releasably or permanently secured to the lower shoulder strap stabilizer and wherein the lower shoulder strap stabilizer is permanently secured to the main body near the bottom of the main body at a lower shoulder strap stabilizer attachment point, whereby each shoulder strap is indirectly secured to the main body.

5. The baby carrier system of claim 1, wherein the main body includes a horizontal stabilizer bar.

6. The baby carrier system of claim 2, wherein the main body includes a horizontal stabilizer bar.

7. The baby carrier system of claim 5, wherein the magnetic attachment system includes a magnetic clip that is positioned at the center of the horizontal stabilizer bar.

8. The baby carrier system of claim 6, wherein the magnetic attachment system includes a magnetic clip that is positioned at the center of the horizontal stabilizer bar.

9. The baby carrier system of claim 1, wherein the magnetic attachment system includes a mechanical release.

10. The baby carrier system of claim 2, wherein the magnetic attachment system includes a mechanical release.

11. The baby carrier system of claim 3, wherein the magnetic attachment system includes a mechanical release.

12. The baby carrier system of claim 4, wherein the magnetic attachment system includes a mechanical release.

13. The baby carrier system of claim 5, wherein the magnetic attachment system includes a mechanical release.

14. The baby carrier system of claim 6, wherein the magnetic attachment system includes a mechanical release.

15. A baby carrier system comprising:
   a. a baby carrier comprising:
      i. a main body that includes a top and a bottom;
      ii. a baby securing system configured to secure a torso of a baby between the baby securing system and the main body; and
      iii. one or more shoulder straps; and
   b. a waist strap;
   wherein the waist strap may be releasably attached to the baby carrier using a waist strap securing system that comprises a magnetic attachment system,
   wherein each shoulder strap is permanently secured to the main body at or near the top of the main body,
   wherein each shoulder strap is releasably or permanently secured directly or indirectly to the main body at or near the bottom of the main body,
   wherein the main body includes a horizontal stabilizer bar, and wherein the magnetic attachment system includes a magnetic clip that is positioned at the center of the horizontal stabilizer bar.

16. The baby carrier system of claim 15, wherein the baby carrier is a multi-functional baby carrier, wherein the main body of the baby carrier includes fastener slits that enable the baby carrier to be reversibly secured to a car seat.

17. The baby carrier system of claim 15, wherein the magnetic attachment system includes a mechanical release.

18. The baby carrier system of claim 16, wherein the magnetic attachment system includes a mechanical release.

19. A baby carrier system comprising:
 a. a baby carrier comprising:
  i. a main body that includes a top and a bottom;
  ii. a baby securing system configured to secure a torso of a baby between the baby securing system and the main body; and
  iii. one or more shoulder straps; and
 b. a waist strap;

wherein the waist strap may be releasably attached to the baby carrier using a waist strap securing system that comprises a magnetic attachment system, wherein the magnetic attachment system releasably attaches the baby carrier to the waist strap via a releasable attachment between a main body magnetic component and a waist strap magnetic component, wherein all attachments between the baby carrier and the waist strap are magnetic attachments, wherein each shoulder strap is permanently secured to the main body at or near the top of the main body, and wherein each shoulder strap is releasably or permanently secured directly or indirectly to the main body at or near the bottom of the main body.

20. The baby carrier system of claim 19, wherein the main body includes a horizontal stabilizer bar, wherein the magnetic attachment system includes a magnetic clip that is positioned at the center of the horizontal stabilizer bar, and wherein the magnetic attachment system includes a mechanical release.

* * * * *